(12) United States Patent
Sturt et al.

(10) Patent No.: US 6,830,280 B2
(45) Date of Patent: Dec. 14, 2004

(54) LEAF SPRING VISOR DETENT ASSEMBLY

(75) Inventors: Alan Sturt, West Bloomfield, MI (US); Harald Satura, Harrison Township, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/708,241

(22) Filed: Feb. 18, 2004

(65) Prior Publication Data

US 2004/0140688 A1 Jul. 22, 2004

Related U.S. Application Data

(62) Division of application No. 10/248,415, filed on Jan. 17, 2003, now Pat. No. 6,722,722.

(51) Int. Cl.[7] .................................................. B60J 3/00
(52) U.S. Cl. ...................................... 296/97.9; 403/329
(58) Field of Search ............................... 296/97.1, 97.4, 296/97.8, 97.9, 97.12; 403/325, 326, 327, 329

(56) References Cited

U.S. PATENT DOCUMENTS

| | | | |
|---|---|---|---|
| 2,908,517 A | 10/1959 | Peras | 296/97.12 |
| 4,626,019 A | 12/1986 | Tung et al. | 296/97.1 |
| 4,821,374 A | 4/1989 | Gavagan | 16/321 |
| 5,139,303 A | 8/1992 | Miller | 296/97.9 |
| 5,364,149 A | 11/1994 | Aymerich et al. | 296/97.12 |
| 5,383,700 A | 1/1995 | Agro et al. | 296/97.9 |
| 5,564,772 A | 10/1996 | Miller | 296/97.12 |
| 5,833,299 A | 11/1998 | Corn | 296/97.11 |
| 6,010,175 A | 1/2000 | Bodar et al. | 296/97.11 |
| 6,099,066 A | 8/2000 | Corn | 296/97.11 |
| 6,139,083 A | 10/2000 | Fischer et al. | 296/97.11 |
| 6,170,899 B1 | 1/2001 | Corn | 296/97.4 |
| RE37,068 E | 2/2001 | Beatty | 296/97.1 |
| 6,428,078 B1 | 8/2002 | Beaver | 296/97.9 |
| 2002/0089210 A1 | 7/2002 | Beaver | 296/97.9 |

*Primary Examiner*—Patricia L. Engle
(74) *Attorney, Agent, or Firm*—Bill C Panagos

(57) ABSTRACT

Lear 03762PATENT11 A three piece retaining leaf spring sun visor detent assembly which is robust and will not fall apart when handled, is low in cost, and allows movement in a direction easily concealed within the sun visor without the necessity of allowing extra clearance.

10 Claims, 3 Drawing Sheets

LEAF SPRING VISOR DETENT ASSEMBLY

This application is a divisional application of original application Ser. No. 10/248,415 filed Jan. 17, 2003 now U.S. Pat. No. 6,722,722.

BACKGROUND OF INVENTION

1. Field of the Invention

The present invention generally relates to a retaining spring for automobile sun visor hinges. More particularly the invention relates to a leaf spring assembly for sun visor hinges which can hold any position among possible positions selected by a user.

2. Description of the Related Art

It is well known that the sun visor hinges normally fitted as a original equipment in automobiles comprise, in essence, a body member defined by the frame of the sun visor or attached to said frame, and also attached to a retaining spring in such a way that said body member and retaining spring cooperate to receive a pivot arm attached to the automobile structure.

This type of unit allows the sun visor to occupy any position among those which are regularly used. The position occupied by the sun visor is held by the gripping action of the retaining spring on the pivot arm. Thereby preventing the vibration caused by the vehicle when being driven from causing undesirable movement of the sun visor.

Generally the retaining spring and the pivot arm are provided with corresponding mechanical means, which usually consist of positioning flats formed on said spring and pivot arm, and allow the rest positions of the sun visor to be held more firmly.

Thus, the sun visor hinge retaining spring assembly applies pressure in two well differentiated ways to the pivot arm. When the sun visor is in any position other than the rest position the spring assembly applies pressure to the outside radius of the pivot arm shaft, and when the sun visor is in the rest position the spring assembly applies pressure against a flat surface or indent surface on the pivot arm shaft.

For example U.S. Pat. No. 5,139,303 issued Aug. 18, 1992 to Miller, teaches the use of a generally U-shaped one piece spring clip mounted in a clip housing located in the body of the sun visor. The spring clip is designed to reduce noise associated with the movement of the sun visor bent shaft against the spring clip during use.

U.S. Pat. No. 5,364,149 issued Nov. 15, 1994 to Aymerich et al, teaches the use of a one piece flat spring in a generally quadrangularly prismatic with rounded side edges shape. This one piece spring is utilized in conjunction with a special housing formed in the body of the sun visor.

U.S. Pat. No. 5,564,772 issued Oct. 15, 1996 to Miller, teaches in one embodiment the use of a generally U-shaped one piece spring clip mounted in a clip housing which is in turn mounted to the vehicle. In another embodiment the reference teaches the use of a generally U-shaped one piece spring clip with integral tabs for mounting on a sun visor body.

U.S. Pat. No. 6,010,175 issued Jan. 4, 2000 to Bodar et al, teaches the use of a coil spring and slow down block assembly are utilized in a specially constructed double body spindle assembly for use in mounting a moveable sun visor to a automobile.

U.S. Pat. No. 5,833,299 issued Nov. 10, 1998 to Corn, teaches an electrically controlled sun visor assembly which also incorporates a spring clip and housing assembly to provide clamping pressure on the support rod used to mount the sun visor body.

U.S. Pat. No. 6,099,066 issued Aug. 8, 2000 to Corn, teaches a sun visor attached to a vehicle utilizing a track assembly to allow for positioning of said visor either in front of the windshield or in front of the side door window. The sun visor also incorporates a spring clip and housing assembly to provide clamping pressure on the support rod used to mount the sun visor body.

U.S. Pat. No. 6,170,899 B1 issued Jan. 9, 2001 to Corn, teaches another embodiment of a sun visor attached to a vehicle utilizing a track assembly to allow for positioning of said visor either in front of the windshield or in front of the side door window. The sun visor also incorporates a spring clip and housing assembly to provide clamping pressure on the support rod used to mount the sun visor body.

U.S. Pat. No. 6,428,078 B1 issued Aug. 6, 2002 to Beaver, teaches a mounting assembly suitable for mounting the bent arm shaft holding a sun visor to an automobile.

U.S. patent application Publication No. 2002/0089210 A1 published Jul. 11, 2002 to Beaver, teaches another embodiment of a mounting assembly suitable for mounting the bent arm shaft holding a sun visor to an automobile.

U.S. Reissue Pat. No. RE37,068 E issued Feb. 27, 2001 to Beatty, teaches a roller blind mechanism for use on the windshield of an automobile and operating similarly to a Venetian blind.

DISCLOSURE OF THE INVENTION

The present invention provides advantages and alternatives over the prior art by providing a low cost, robust three piece retaining spring assembly which is robust and will not fall apart when handled.

According to a further aspect of the present invention, there is provided a retaining spring assembly that allows for movement in a direction which is easily concealed within a sun visor without the need for extra clearance.

According to yet another aspect of the present invention there is provided a retaining spring assembly which may be assembled outside of the sun visor without the problem of the assembly coming apart before installation within the sun visor body.

According to a yet further aspect of the present invention there is provided a retaining spring assembly that allows for very thin sun visors.

According to still yet a further aspect of the present invention there is provided a retaining spring assembly which is economical to produce and install.

According to a still further aspect one particularly preferred embodiment of the present invention provides for a retaining leaf spring sun visor detent assembly for automobile sun visor hinges comprising: a housing member symmetrical about a longitudinal center plane, said housing having a generally U shape, the longitudinal ends of said U shape housing member having a plurality of openings spacedly located therein; a saddle member symmetrical about a longitudinal center plane, said saddle having a generally flattened U shape, the longitudinal ends of said flattened U shape having a plurality of openings spacedly located therein and further located to correspond to the plurality of openings in said housing member, and a leaf spring having a plurality of tabs spacedly located thereon and further located to correspond to the plurality of openings in said housing member and said saddle member, thereby holding said retaining leaf spring sun visor detent assembly together as a single unit by said leaf spring tabs projecting through said openings in said housing member and said saddle member.

Still another aspect another particularly preferred embodiment of the present invention provides for a retaining leaf spring sun visor detent assembly for automobile sun visor hinges comprising: a housing member symmetrical about a longitudinal center plane, said housing having a generally U shape, the longitudinal ends of said U shape housing member having, a first plurality of openings spacedly located therein, and further having inwardly facing tabs located on each of said plurality of openings, and a second plurality of openings spacedly located therein having inwardly facing tabs located on each of said plurality of openings, said second plurality inwardly facing tabs positioned to correspond with the plurality of openings in the saddle; and a saddle member, being shorter in length than said housing member and the leaf spring, and symmetrical about a longitudinal center plane, said saddle having a generally flattened U shape and further being shorter in length than said housing member and said leaf spring, the longitudinal ends of said flattened U shape having a plurality of openings spacedly located therein and further located to correspond to the second plurality of openings in said housing member; and a leaf spring, whereby said retaining leaf spring sun visor detent assembly being held together as a single unit by said housing member tabs projecting inwardly.

Although the preferred embodiments of the present invention has been disclosed, various changes and modifications may be made without departing from the scope of the invention as set forth in the appended claims.

The present invention thus advantageously provides a retaining spring assembly which is inexpensive, reliable, easy to install, allows for very thin sun visor profiles, and requires no additional mechanical assembly upon installation in a sun visor.

DETAILED DESCRIPTION

Figure 1:
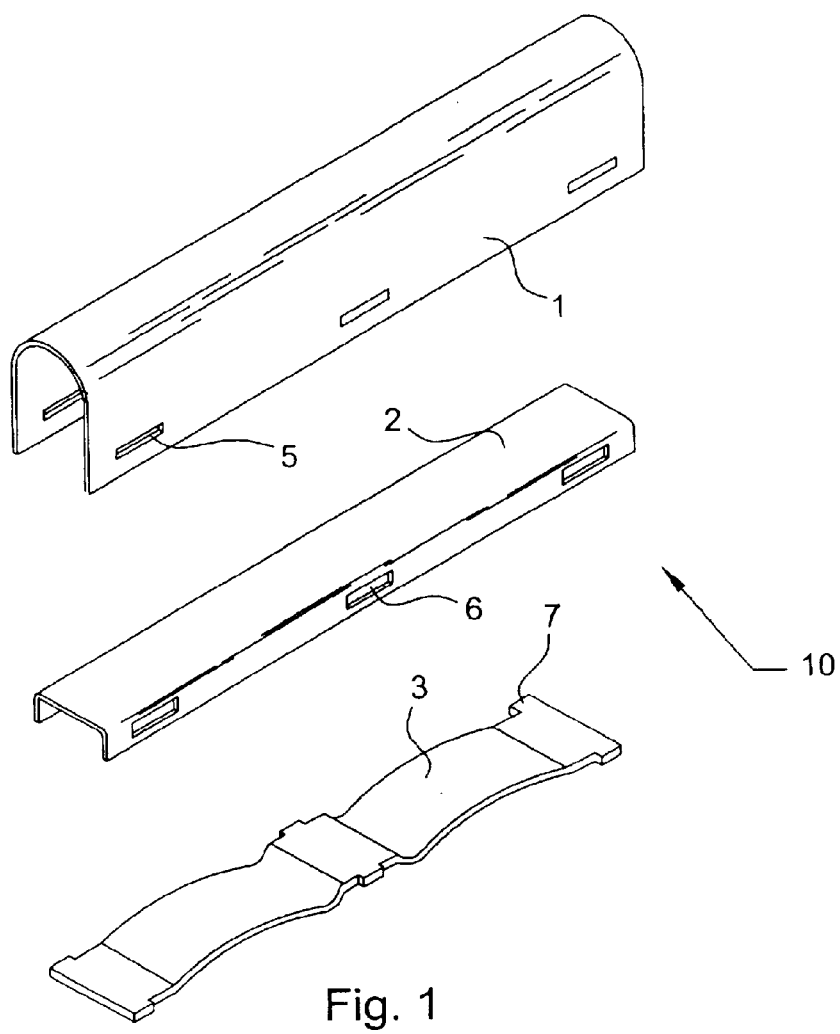
FIG. 1 shows an exploded perspective view of one preferred embodiment of the present invention.

Reference will now be made to the drawings, wherein to the extent possible like reference numerals are utilized to designate like components throughout the various views. Referring to FIG. 1, which presents an exploded perspective view of one preferred embodiment of the leaf spring sun visor detent assembly 10 comprising a housing 1 having a generally U shape and further having a plurality of openings 5 located along both longitudinal edges of housing 1; a saddle 2 having a generally U shape and having a plurality of openings 6 located along both longitudinal edges of saddle 2 and further located to correspond to the openings 5 on housing 1; and a leaf spring 3 having a plurality of tabs 7 located along both longitudinal edges of leaf spring 3 and further located to correspond to the locations of the openings 5 in housing 2 and openings 6 in saddle 2. The said tabs 7 locking the leaf spring sun visor detent assembly 10 together into a unit.

Figure 2:
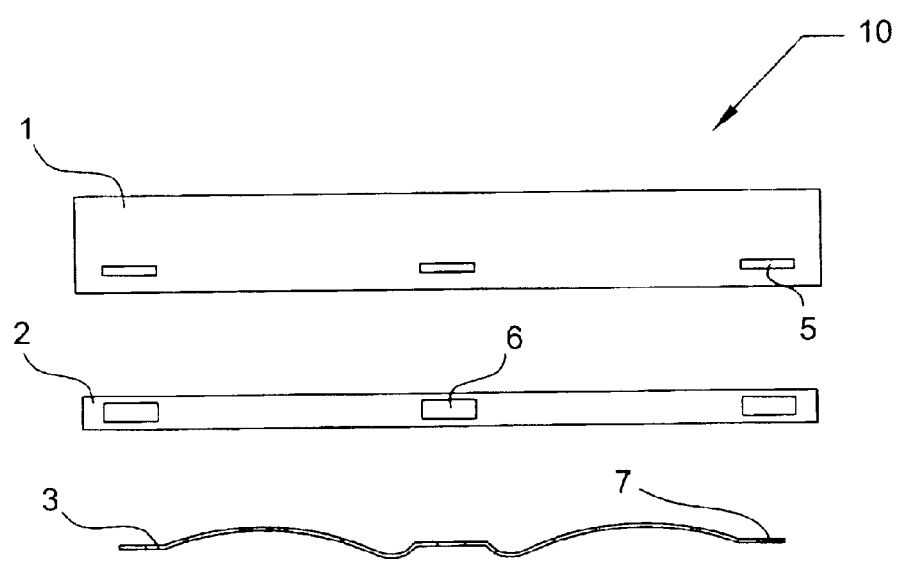
FIG. 2 shows an exploded side plan view of the preferred embodiment of the present invention of FIG. 1.

Referring now to FIG. 2, there is shown a plan side view of the preferred embodiment of the leaf spring sun visor detent assembly 10 again showing a housing 1 having a generally U shape and further having a plurality of openings 5 located along both longitudinal edges of housing 1; a saddle 2 having a generally U shape and having a plurality of openings 6 located along both longitudinal edges of saddle 2 and further located to correspond to the openings 5 on housing 1; and a leaf spring 3 having a plurality of tabs 7 located along both longitudinal edges of leaf spring 3 and further located to correspond to the locations of the openings 5 in housing 2 and openings 6 in saddle 2. The said tabs 7 locking the leaf spring sun visor detent assembly 10 together into a unit.

Figure 3:
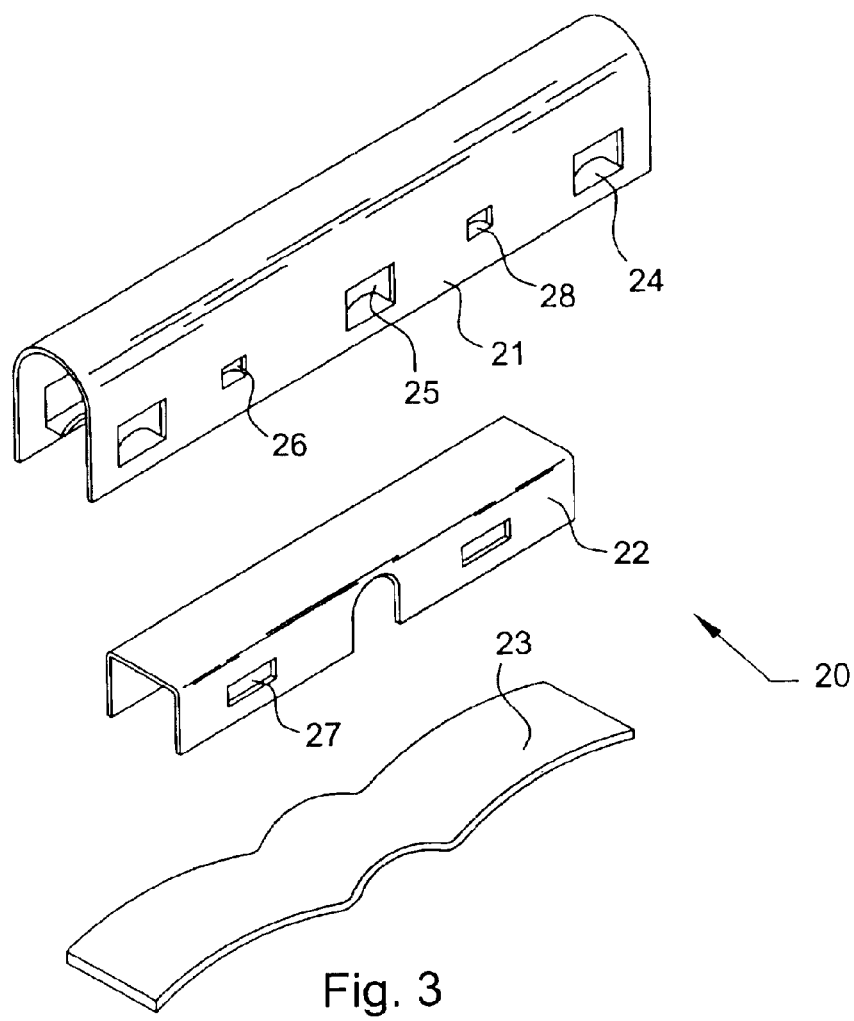
FIG. 3 shows an exploded perspective view of another preferred embodiment of the present invention.

Turning now to FIG. 3 which presents an exploded perspective view of another preferred embodiment of the leaf spring sun visor detent assembly 20 comprising a housing 21 having a generally U shape, and having a plurality of openings 25 located along both longitudinal edges of housing 21, and further having an inwardly facing tab 24 created during the forming of said openings 25 and located on the edge of each opening 25 nearest the longitudinal edge of said housing 21, additionally having a pair of openings 26 located along both longitudinal edges of housing 21, and further having an inwardly facing tabs 28 created during the forming of said openings 26 and located on the edge of each opening 26 nearest the longitudinal edge of said housing 21 and positioned so as to allow the corresponding openings 27 in saddle 22 to have inwardly facing tabs 28 positioned therein; a saddle 22 having a generally U shape and having a length shorter than the length of housing 21 and spring 23; and a leaf spring 23.

Figure 4:
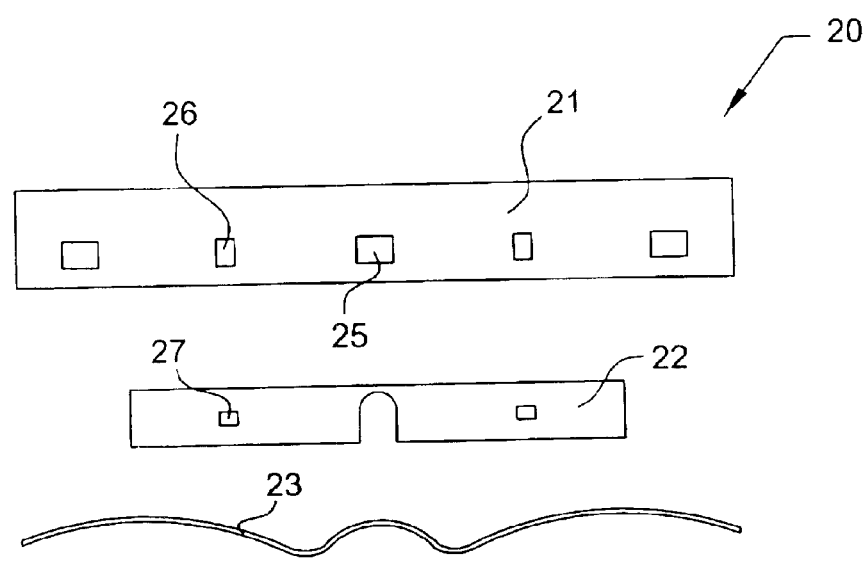
FIG. 4 show an exploded side plan view of the preferred embodiment of the present invention of FIG. 3.

FIG. 4 presents a plan side view of the preferred embodiment of the leaf spring sun visor detent assembly 20 again showing a housing 21 having a generally U shape, and having a plurality of openings 25 located along both longitudinal edges of housing 21, and further having an inwardly facing tab 24 created during the forming of said openings 25 and located on the edge of each opening 25 nearest the longitudinal edge of said housing 21, additionally having a pair of openings 26 located along both longitudinal edges of housing 21, and further having an inwardly facing tabs 28 created during the forming of said openings 26 and located on the edge of each opening 26 nearest the longitudinal edge of said housing 21 and positioned so as to allow the corresponding openings 27 in saddle 22 to have facing tabs 28 positioned therein; a saddle 22 having a generally U shape; and a leaf spring 23. The inwardly facing tabs 24 of housing 21 holds the saddle 22 and leaf spring 23 in housing 21 thereby locking the leaf spring sun visor detent assembly 20 together as a unit.

Figure 5:
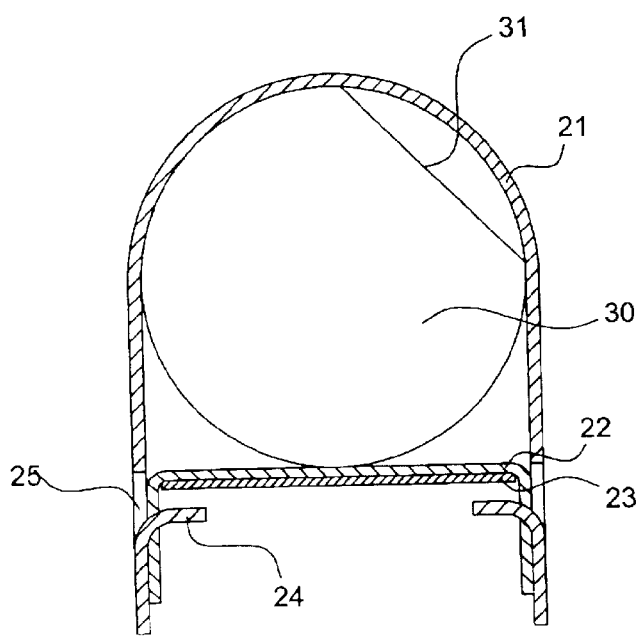
FIG. 5 shows a plan end view section of a preferred embodiment of the present invention.

Referring to FIG. 5 there is presented a plan end view section of the preferred embodiment of the leaf spring sun visor detent assembly shown in FIGS. 3 and 4. The inwardly facing tabs 25 hold the saddle 22 and the leaf spring 23 in position such that when a sun visor rod 30 having a flat face 31 is inserted into the leaf spring sun visor detent assembly 20 the spring 23 pushes against saddle 22 which in turn pushes against said rod 30 creating sufficient tension to maintain the position of the sun visor. In this figure the sun visor is positioned in a non-storage position and the leaf spring sun visor detent assembly is applying pressure against a curved section of the sun visor rod 30 thereby holding the sun visor in a user selected position.

Figure 6:
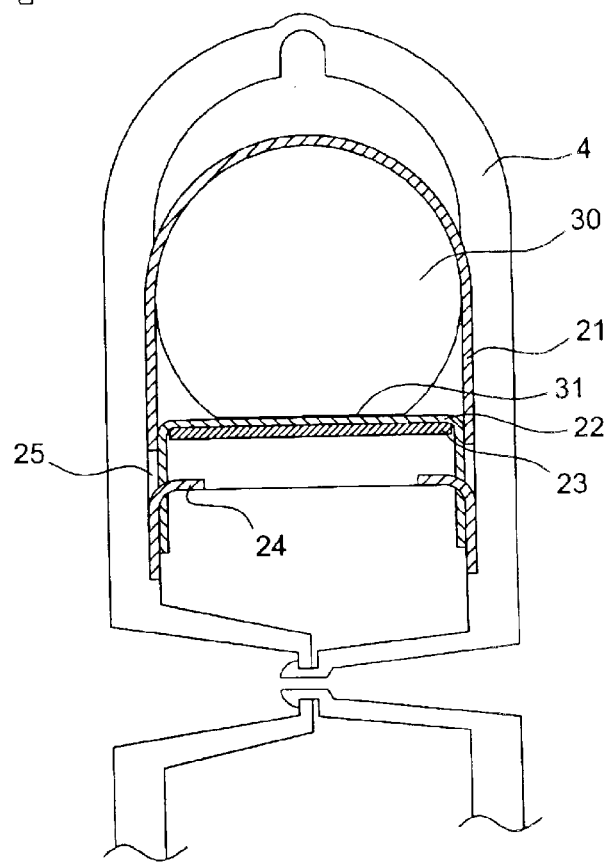
FIG. 6 shows a plan end view section of one preferred embodiment of the present invention mounted in a sun visor body.

And now referring to FIG. 6 there is presented a plan end view section of the preferred embodiment of the leaf spring sun visor detent assembly shown in FIGS. 3 and 4 mounted in a sun visor 4 shown in plan partial end view section. The leaf spring sun visor detent assembly housing 21 is shown having saddle 22 and leaf spring 23 movably fixedly mounted therein by tabs 24. The leaf spring 23 is exerting pressure against saddle 22 which in turn is exerting pressure against the flat face 31 of sun visor pivot arm shaft 30 thereby holding the sun visor 4 stationary in its storage or full up position. FIG. 6 further shows a preferred mounting system wherein the interior of the sun visor 4 has a cavity adapted to receive the leaf spring sun visor detent assembly 20 without the need for additional mounting and/or attachment means.

In practice the housings 1 and 21; and saddles 2 and 22 are constructed of sheet metal, preferably sheet steel, preferably sheet steel having a thickness of from about 0.3 mm to about 0.8 mm, and most preferably of sheet steel having a thickness of about 0.5 mm. However it is to be understood that any sheet metal known in the appropriate arts are suitable for use with the present invention.

It will also be appreciated that the springs 3 and 23 may be made from any suitable leaf spring material. The presently preferred leaf spring material is sheet spring steel having a thickness of from about 0.7 mm to about 1.1 mm, and most particularly of about 0.9 mm. The leaf springs 23 generally have a shape comprising two curved portions separated at the center by a more tightly curved portion, arranged so as to cooperate with the center tab of the housing to maintain location. Spring loading is shared by the three curved tabs 25 on each side of the housing.

While the invention has been shown using the preferred mounting and attachment means it is to be understood that other means of attachment and/or mounting may be utilized as is well known in the art.

What is claimed is:

1. A retaining leaf spring sun visor detent assembly for automobile sun visor hinges comprising:
   a leaf spring,
   a housing member symmetrical about a longitudinal center plane, said housing having a generally U shape, the U shape housing member having:
   a first plurality of openings spacedly located on longitudinal ends of said U shape housing, and further having first inwardly facing tabs located on each of said first plurality of openings, and
   a second plurality of openings spacedly located inward of the longitudinal ends of said U shape housing and further having second inwardly facing tabs located on each of said second plurality of openings; and
   a saddle member being symmetrical about a longitudinal center plane, said saddle member having a generally flattened U shape and further being shorter in length than said housing member and said leaf spring, the longitudinal ends of said flattened U shape having a plurality of openings spacedly located therein and further located to correspond to the second plurality of openings in said housing member; and
   whereby said retaining leaf spring sun visor detent assembly being held together as a single unit by said second inwardly facing tabs aligning with the plurality of openings in the saddle member and the leaf spring being supported by the first inwardly facing tabs.

2. The invention as claimed in claim 1 wherein, said housing member and said saddle member are comprised of sheet steel.

3. The invention as claimed in claim 2 wherein, said sheet steel has a thickness of from about 0.3 mm to about 0.8 mm.

4. The invention as claimed in claim 2 wherein, said sheet steel has a thickness of about 0.5 mm.

5. The invention as claimed in claim 1 wherein, said leaf spring comprises sheet spring steel.

6. The invention as claimed in claim 5 wherein, said sheet spring steel has a thickness of from about 0.7 mm to about 1.1 mm.

7. The invention as claimed in claim 5 wherein, said sheet spring steel has a thickness of about 0.9 mm.

8. The invention as claimed in claim 1 wherein, said leaf spring has two curved portions separated by a more tightly curved portion.

9. The invention as claimed in claim 1 wherein, said openings and said tabs in said housing member are formed in a single operation.

10. A sun visor for use in automobiles having the leaf spring sun visor detent assembly as claimed in claim 1 mounted therein.

* * * * *